(12) United States Patent
Alberding et al.

(10) Patent No.: US 8,284,109 B2
(45) Date of Patent: Oct. 9, 2012

(54) TELESCOPING RADAR ARRAY

(75) Inventors: Mark R. Alberding, Glen Arm, MD (US); Tushar K. Shah, Columbia, MD (US); John F. Strempel, Marcellus, NY (US); Edward P. Olszewski, Syracuse, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1158 days.

(21) Appl. No.: 11/932,675

(22) Filed: Oct. 31, 2007

(65) Prior Publication Data

US 2010/0066617 A1    Mar. 18, 2010

(51) Int. Cl.
*H01Q 1/32*    (2006.01)
(52) U.S. Cl. .................. 343/713; 343/700 MS
(58) Field of Classification Search ............. 343/DIG. 2, 343/915, 911 R, 895, 893, 890, 881, 873, 343/872, 853, 844, 840, 834, 833, 824, 818, 343/817, 814, 812, 810, 800, 797, 795, 793, 343/792.5, 792, 789, 786, 785, 778, 777, 343/772, 771, 770, 768, 767, 766, 763, 761, 343/757, 754, 753, 725, 713, 711, 708, 705, 343/703, 702, 700 MS; 342/94, 93, 92, 90, 342/89, 83, 81, 71, 70, 67, 59, 54, 52, 51, 342/43, 40, 4, 383, 380, 379, 378, 377, 376, 342/375, 374, 373, 372, 371, 368, 354, 28, 342/27, 26 R, 26 B, 25 R, 25 F, 25 C, 25 B, 342/25 A, 22, 204, 202, 201, 20, 197, 196, 342/195, 194, 190, 189, 184, 179, 176, 175, 342/174, 173, 165, 162, 161, 160, 159, 157, 342/154, 153, 149, 147, 146, 145, 135, 134, 342/132, 131, 13, 128, 120, 118, 115, 114, 342/111, 110, 109, 107

See application file for complete search history.

(56) References Cited

U.S. PATENT DOCUMENTS 2,273,628 A * 2/1942 de Beaumont ................. 52/113
4,137,535 A   1/1979 Rupprecht
4,151,534 A   4/1979 Bond
(Continued)

FOREIGN PATENT DOCUMENTS

EP    WO 2006031708 A2    3/2006
(Continued)

OTHER PUBLICATIONS

Mercier, Francois, "PCT Application No. PCT/2008/080913 International Search Report and Written Opinion", Feb. 4, 2009, Publisher: EPO, Published in: EP.

*Primary Examiner* — Jacob Y Choi
*Assistant Examiner* — Kyana R McCain
(74) *Attorney, Agent, or Firm* — Kaplan Breyer Schwarz & Ottesen, LLP

(57) ABSTRACT

A mobile, telescoping radar array is disclosed. In some embodiments, the radar array has a plurality of support stages that fully nest when stowed and assume a telescoped form when deployed. A plurality of radiating elements depend from each stage. The support stages, as deployed, have a geometry that supports 360 degrees of radar coverage without rotating or otherwise repositioning the radar array.

19 Claims, 7 Drawing Sheets

U.S. PATENT DOCUMENTS

| | | | |
|---|---|---|---|
| 4,198,637 A | 4/1980 | Sand | |
| 4,303,872 A | 12/1981 | Alf et al. | |
| 4,468,675 A * | 8/1984 | Robinson | 343/828 |
| 4,520,365 A | 5/1985 | Langheck | |
| 4,658,260 A | 4/1987 | Myer | |
| 4,980,692 A * | 12/1990 | Rudish et al. | 343/700 MS |
| 5,072,230 A | 12/1991 | Taniyoshi et al. | |
| 5,101,215 A | 3/1992 | Creaser, Jr. | |
| 5,196,857 A | 3/1993 | Chiappetta et al. | |
| 5,220,341 A | 6/1993 | Yamazaki | |
| 5,264,863 A | 11/1993 | Miner, Jr. et al. | |
| 5,333,422 A * | 8/1994 | Warren et al. | 52/115 |
| 5,467,097 A | 11/1995 | Toko | |
| 5,874,915 A | 2/1999 | Lee et al. | |
| 5,900,846 A | 5/1999 | Phelps et al. | |
| 5,909,194 A | 6/1999 | Umeda et al. | |
| 6,107,969 A | 8/2000 | Gulino et al. | |
| 6,137,291 A | 10/2000 | Szumowski et al. | |
| 6,693,595 B2 * | 2/2004 | Lee | 343/700 MS |
| 7,000,357 B1 * | 2/2006 | Stearns et al. | 52/110 |
| 7,102,590 B2 | 9/2006 | Regala | |
| 2004/0046688 A1 * | 3/2004 | Bigge et al. | 342/52 |
| 2004/0173041 A1 | 9/2004 | Said | |
| 2005/0097833 A1 * | 5/2005 | Campbell et al. | 52/118 |
| 2006/0092075 A1 | 5/2006 | Bruce et al. | |
| 2006/0226924 A1 * | 10/2006 | Chen et al. | 333/1.1 |
| 2006/0262499 A1 * | 11/2006 | Vinson et al. | 361/687 |
| 2008/0001841 A1 | 1/2008 | Alberding et al. | |

FOREIGN PATENT DOCUMENTS

EP    WO 2007082335 A1    7/2007

* cited by examiner

TELESCOPING RADAR ARRAY

FIELD OF THE INVENTION

The present invention relates to radar in general, and, more particularly, to ground-based mobile radar systems.

BACKGROUND OF THE INVENTION

Brigade-size and larger-size forces often use mobile radar systems to detect and track incoming artillery and rocket fire to determine the point of origin for counter-battery fire. These mobile radar systems are typically trailer mounted and towed by a vehicle, such as a HUMVEE.

These mobile radar systems usually take the form of a planar array that is either mechanically or electronically steered. In mechanically-steered systems, the planar array is continuously physically rotated 360° by a drive system. This enables the mechanically-steered radar to scan a full 360° of azimuth. Electronically-steered arrays, on the other hand, do not actually move while in operation. Rather, a sequence of electromagnetic "beams" is rapidly electronically swept over a 90° area. To scan a full 360°, the electronically-steered planar array must be physically repositioned (three times to scan the remaining 270° in 90° sectors) or supplemented by three additional systems, each scanning a different 90° sector of azimuth. Some electronically-steered mobile radar sets, such as the AN/TPQ-36 Firefinder radar, include a drive system for providing a 360° sectoring mode. In this mode, a first 90° sector is briefly electronically scanned and then the array is automatically rotated to sequentially scan, in turn, the three remaining 90° sectors.

Planar radar arrays have certain drawbacks. In particular, they are required to withstand wind loads and ice. Furthermore, to the extent that the arrays are rotated, they must be stable against off-axis rotation and tipping moments, etc. For mechanically-steered arrays, the actuation and drive systems are complex and expensive. And, to the extent that the issue of wind loads and ice is addressed by a more robust mechanical design (e.g., increased weight, etc.), the load on the drive system is increased, thereby requiring more power and heavier drive-system components. Additionally, it is difficult to provide sufficient cooling efficiency for air-cooled radar systems. Also, EMI shielding can be problematic for planar arrays.

In an attempt to reduce the weight and thereby increase the functionality and mobility of mobile radars, lightweight composite structures are being developed for this application. But it is proving to be problematic to implement planar radar antenna arrays using composite materials. In particular, it is proving to be difficult to develop composites that are adequately stiff to withstand deflection (e.g., weight, wind loads, ice, etc.), yet have suitable damage tolerance.

As a consequence, there is a need for a new design for a mobile radar array that addresses the shortcomings of the prior art, such as the tradeoff between weight and robustness, issues pertaining to cooling, EMI shielding, transportation, and the complexity of the drive system.

SUMMARY OF THE INVENTION

The present invention provides a mobile radar system that avoids some of the costs and disadvantages of the prior art.

In accordance with the illustrative embodiment, the mobile radar system has a plurality of "telescoping" support stages that fully nest when stowed and assume an extended, telescoped-form when deployed. The radar array includes a plurality of radiating antenna elements that depend from each of support stages.

In preferred embodiments, the deployed array has a geometry that supports 360 degrees of radar coverage without having to rotate or otherwise reposition the array. That is, the array is electronically steered through 360 degrees. Suitable array geometries for 360-degree coverage include, without limitation, cylindrical, pyramidal, conical, cubical, and the like. The array provides a varying amount of elevation coverage as a function of the precise positioning of the radiating elements and the amount of phase and amplitude pre-processing that is performed on the transmitted radar signals.

The telescoping radar array disclosed herein has a number of advantages in comparison with prior-art mobile radars. For example and without limitation, embodiments of the telescoping radar array described herein provide:

A collapsible array. Since the array is collapsible and fully nests, it is better able to withstand the rigors of transport and requires less space than prior-art designs. In fact, the collapsible nature of the array provides significant advantages compared to the prior art in terms of C130 transport, rail transport, ground transport, and the like.

A non-rotating system. Since the array does not physically rotate, it provides superior performance in high-wind conditions, since rotating arrays are subject to inconsistent rotation in high winds. Furthermore, the system has greater stability, since there are no off-axis rotation concerns or tipping moments. Additionally, the telescoping radar array has greater reliability than prior-art rotating flat-planar arrays, since there are no moving parts to wear out. Specifically, a main bearing, slip ring, position encoder, and servo rotation speed control, which are normally required for rotating arrays, are used in the illustrative embodiment.

Resistance to deflection. The geometry of the telescoping array disclosed herein is inherently stiff and its symmetric structure results in more consistent and uniform wind loading, so that the array can operate in higher winds than flat planar arrays.

Simple actuation. Since the array does not rotate, but rather simply deploys in linear fashion, its actuating systems are less complex than for mechanically-rotated radars.

Low RCS. Due to its geometry, the telescoping radar array disclosed herein is expected to have a lower radar cross section than prior-art arrays.

Less weight. Since the telescoping radar array is not rotated, a drive system and associated controls are not required, thereby reducing weight relative to rotating flat planar arrays. Also, due to its geometry, the telescoping radar array is inherently stiff such that it can be formed from relatively light-weight composite materials. As previously noted, such composites are not well suited for use in conventional mobile radars because the stiffness/damage tolerance issue.

BRIEF DESCRIPTION OF THE DRAWINGS

FIG. 1A depicts radar array 100 in a stowed state (for transport) on the back of a vehicle.

FIG. 1B depicts radar array 100 in a deployed state (for use) on the back of a vehicle.

FIGS. 9A-12A depict, via top views, various configurations of the support stages of radar array 100.

FIGS. 9B-12B depict side views that correspond to the top views shown in FIGS. 9A-12A, respectively.

DETAILED DESCRIPTION

Figure 1:
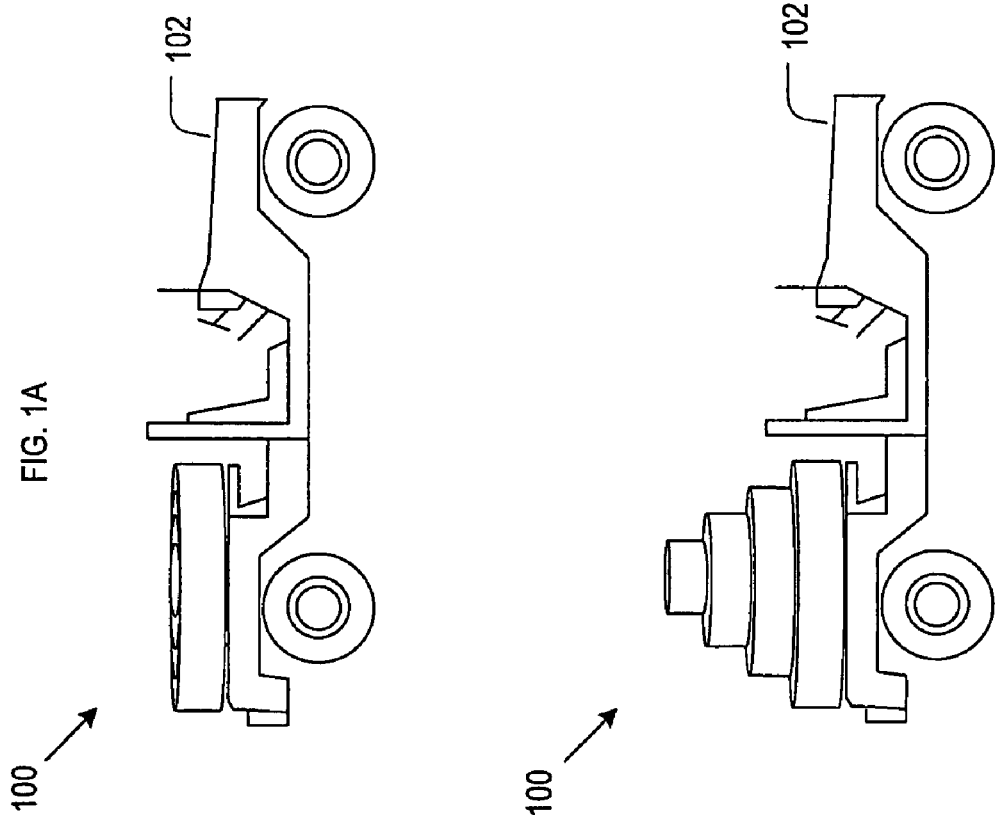
FIG. 1A depicts portable telescoping radar array 100 in accordance with the illustrative embodiment of the present invention.
FIG. 1B depicts portable telescoping radar array 100 in accordance with the illustrative embodiment of the present invention.

FIGS. 1A and 1B depicts mobile telescoping radar array 100 in accordance with the illustrative embodiment of the present invention.

In these Figures, radar array 100 is situated on vehicle 102 for transportation and deployment. FIG. 1A depicts radar array 100 in a stowed state, which is used for transportation or storage. Radar array 100 is not operational in this state. FIG. 1B depicts radar array 100 in a deployed state for use. Radar processing electronics for data acquisition and processing, which is also a part of radar array 100, is not depicted in FIGS. 1A and 1B (see, FIG. 4).

Figure 2:
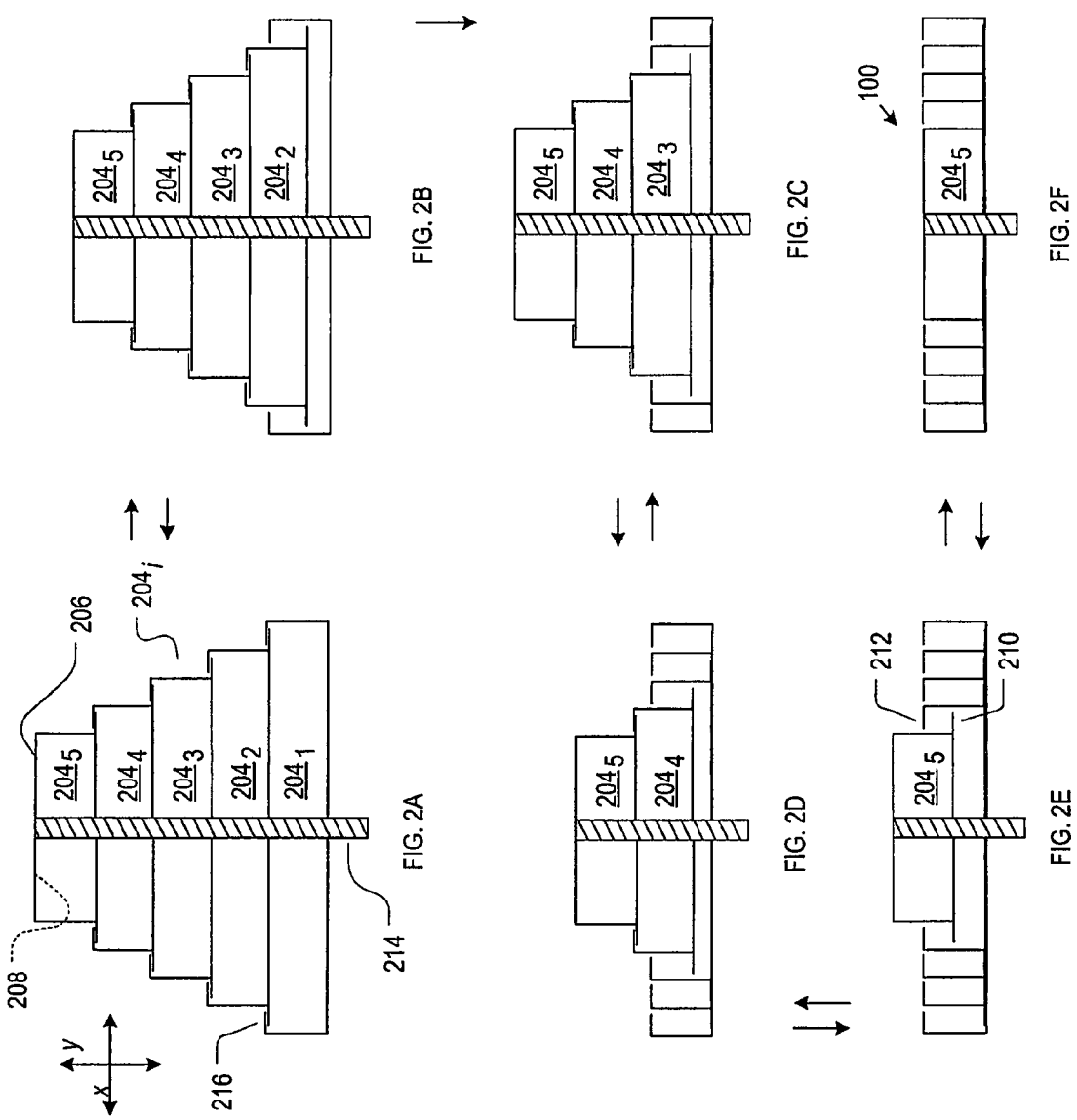
FIGS. 2A-2F depict a reversible sequence showing the collapse (forward sequence) or deployment (reverse sequence) of radar array 100.

FIGS. 2A through 2F depict radar array 100, sans vehicle 102, in various stages of deployment. The ordered sequence FIG. 2A→FIG. 2F depicts retraction of the radar array and the sequence FIG. 2F→FIG. 2A depicts deployment of the array. For reference, in these Figures, the x-axis (i.e., horizontal) is the "radial" direction and the y-axis (i.e., vertical) is the "axial" direction.

The structural shell of radar array 100 comprises a plurality support stages $204_i$. In the embodiment that is depicted in FIGS. 2A through 2F, there are five support stages $204_1$ through $204_5$. In some other embodiments, radar array 100 comprises fewer than five support stages $204_i$. In still further embodiments, radar array 100 comprises more than five support stages $204_i$.

Innermost support stage $204_5$, which upon deployment becomes the "top" of the telescoping array (see, e.g., FIGS. 2A and 2F), includes cover 206. Other support stages (e.g., $204_1$ through $204_4$ for this embodiment) do not include a cover since they each must accommodate axial deployment of other stages.

Each support stage $204_i$ preferably enables radar scanning of 360 degrees of azimuth. To that end, in the illustrative embodiment, each support stage is in the form of an annulus (i.e., each stage has a circular form). In some alternative embodiments, however, support stages are not circular. For example, as described in further detail later in this specification in conjunction with FIGS. 9A/9B through 12A/12B, support stages can have a polygonal shape (e.g., triangular, square, etc.; see, FIGS. 9A/B, 10A/B).

In the illustrative embodiment, the deployed array has a stepped "face" or profile. In some alternative embodiments, the profile is not stepped, but rather has a smoothly-tapering profile (see, e.g., FIGS. 11A/B, 12A/B).

Regardless of actual configuration, it is desirable for support stage $204_i$ to enable a radar scan of 360-degrees of azimuth without the need to rotate or otherwise re-position the array. For convenience, the term "ring" or "ring-shaped" will be used in the appended claims to refer generically to support stages $204_i$ that have a form or shape that is suitable for covering 360 degrees of azimuth, irrespective of the actual geometric configuration of the support stage.

Support stages $204_i$ are coaxial with respect to each other and radially-spaced apart from each other so that they are capable of nesting (see, e.g., FIG. 2F). The nested arrangement provides a high-packing density and efficient use of space to address transportation and storage issues.

Support stages $204_i$ are axially-deployable; axial deployment is depicted via the sequence of figures proceeding from FIG. 2F to FIG. 2A. In the illustrative embodiment, actuator 214, which can be, without limitation, a piston or a drive screw, is used to deploy or retract radar support stages $204_i$. In various embodiments, actuator 214 can be driven hydraulically, pneumatically, electrically, magnetically, etc. Furthermore, actuation can be manual; that is, an operator can, for example, use a hand-crank to deploy/retract the array.

In the illustrative embodiment, mechanical actuator 214 directly drives support stage $204_5$, which is the innermost of the support stages and axially extends (and moves) the furthest during deployment. That is, support stage $204_5$ is the "top" of the deployed radar array. For this embodiment, mechanical actuator 214 physically contacts undersurface 208 of cover 206 of support stage $204_5$; there is no contact between actuator 214 and the other support stages.

As described further below, support stages $204_i$ include mechanical coupling elements. These coupling elements are dimensioned and arranged so that a "temporary" physical coupling occurs between adjacent support stages during deployment. These temporary couplings enable the driven support stage (i.e., support stage $204_5$) to effectively drag stages $204_4$, $204_3$, and $204_2$ to their deployed positions.

Figure 3:
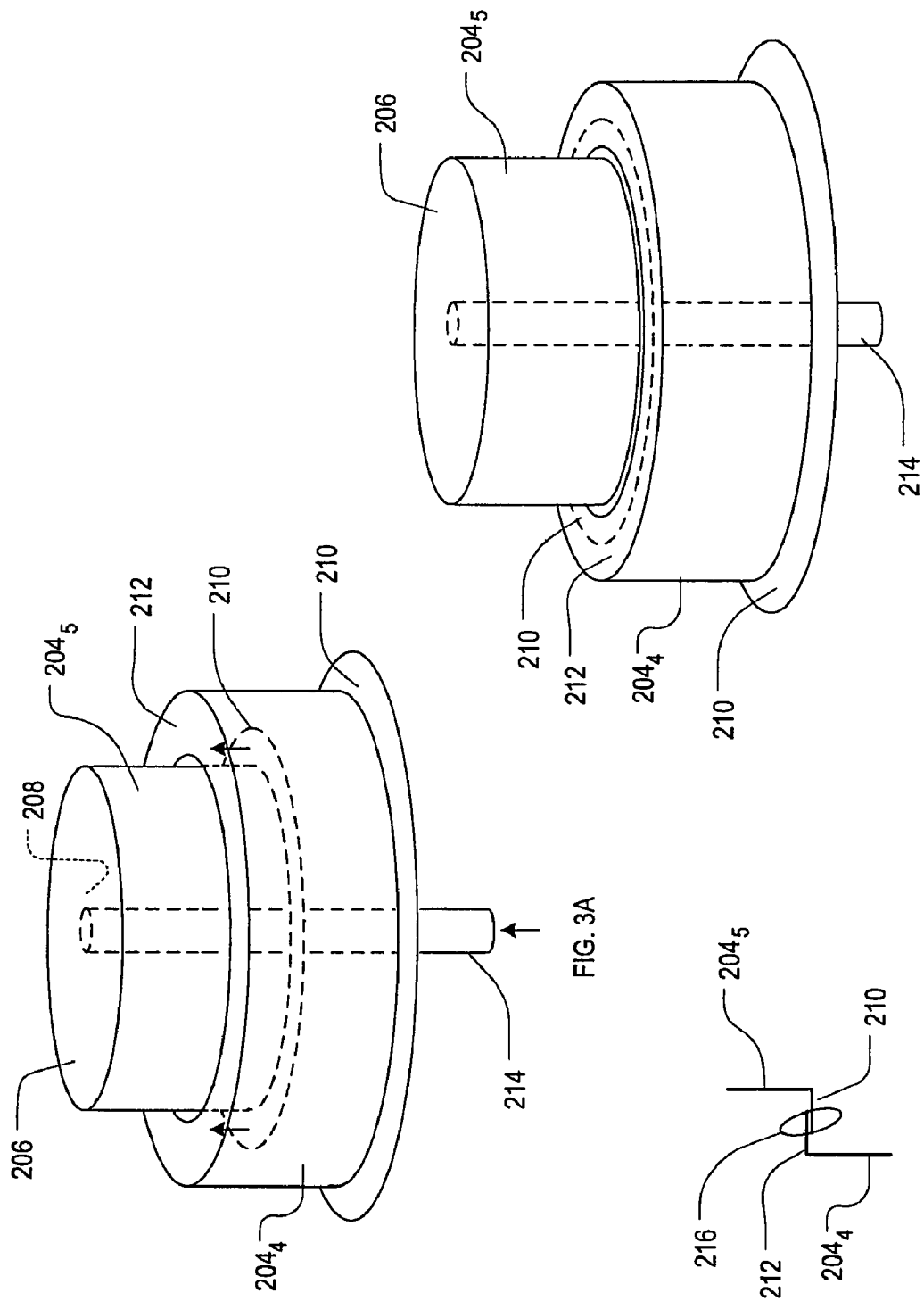
FIGS. 3A-3C depict details of flanges from adjacent support stages coming into contact.

With reference to the sequence of FIGS. 2F to 2A, FIG. 2A depicts support stages $204_1$ through $204_5$ in a fully nested state. FIG. 2E depicts the beginning of the deployment operation wherein actuator 214 drives support stage $204_5$ in an axial direction, which is typically "upward." This is depicted via a perspective view in FIG. 3A. For the sake of clarity, the remaining support stages are not depicted in FIG. 3A. FIGS. 2E and 3A depict lower circumferential lip or flange 210 of support stage $204_5$ approaching upper circumferential flange 212 of adjacent support stage $204_4$. In the illustrative embodiment, flanges 210 and 212 serve as the aforementioned mechanical coupling elements.

With increasing upward axial movement, lower flange 210 of support stage $204_5$ contacts upper flange 212 of support stage $204_4$. This is depicted in FIG. 3B and schematically in FIG. 3C (slight gap shown for clarity). Contact between the two flanges 210 and 212 results in the creation of temporary seal 216. This seal, which is created between all adjacent support stages (see, e.g., FIG. 2A), keeps weather (e.g., rain, snow, ice, etc. out of the interior volume defined by the fully telescoped stages. This is beneficial since, in some embodiments, the radiating elements will be exposed on the interior surface of each support stage $204_i$. Furthermore, the seals are advantageously EMI compliant.

As actuator 214 continues to drive support stage 204₅, support stage 204₄ is lifted, as depicted in FIG. 2D. Deployment continues as stage 204₃ (FIG. 2C) and stage 204₂ (FIG. 2B) are sequentially lifted.

The mechanical coupling elements can have a different physical configuration than the flanges depicted in the illustrative embodiment. In preferred embodiments, the mechanical coupling elements provide both a coupling and sealing functionality. In less preferred embodiments, different elements are used in combination to provide these two functions.

It will be appreciated that telescoping support stages 204ᵢ can be actuated via a means other than a rigid actuator such as depicted in the illustrative embodiment. For example, and without limitation, a cabled actuator can be used. In some embodiments (not depicted) that use a cabled actuator, each support stage 204ᵢ is coupled to all other support stages via an actuator cable akin to the arrangement of a multi-section extension ladder.

Figure 4:
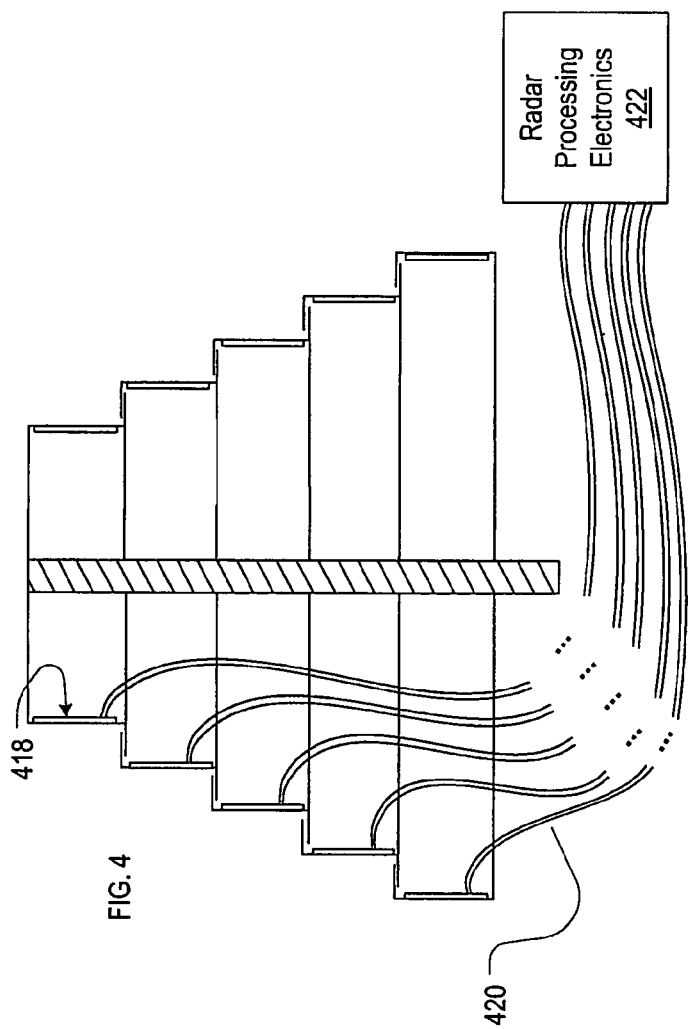
FIG. 4 depicts radiating elements depending from the support stages of telescoping radar array 100.

FIG. 4 depicts radiating elements disposed on interior surface of the various supports stages 204ᵢ. Although only a single radiating element is depicted on each support stage, it will be understood that a plurality of such radiating elements are situated along the interior surface of each support stage, thereby providing 360 degrees of azimuth coverage. The actual number of radiating elements per stage is a function of the desired radar resolution, which is ultimately a function of the specific radar application. In conjunction with the present disclosure, those skilled in the art will be able to determine how many radiating elements should be used, per stage, as a function of application specifics and other considerations.

Electrical lines 420 lead from each radiating element 418 to radar processing electronics 422. Radar processing electronics is typically located in the vicinity of the support stages (e.g., beneath them, or elsewhere on the radar-transport vehicle, etc.). In some embodiments, radar processing electronics are disposed directly behind radiating elements 418.

Radar processing electronics 422 provides data acquisition and processing. The radar processing electronics is typically electrically connected to a screen (not depicted), so that a view of the search volume (e.g., showing radar contacts) is displayed to an operator. Those skilled in the art will know how to specify and use radar processing electronics 422.

Figure 5C:
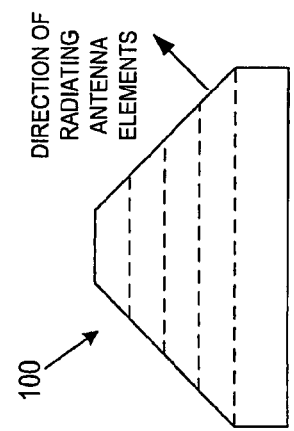
FIG. 5C depicts a third embodiment of radar array 100 wherein the radiating antenna elements are at an angle relative to the horizon.
Figure 5B:
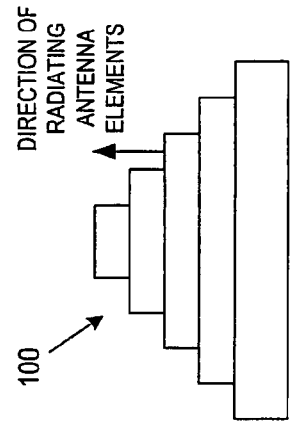
FIG. 5B depicts a second embodiment of radar array 100 wherein the radiating antenna elements face skyward.
Figure 5A:
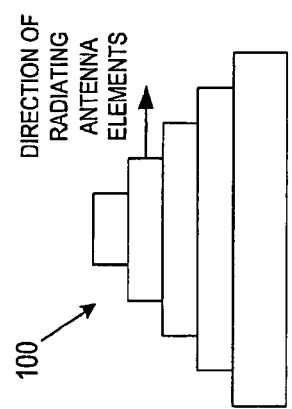
FIG. 5A depicts a first embodiment of radar array 100 in which the radiating elements face the horizon (as in FIG. 4).

FIG. 5A depicts the direction of radiation when radiating elements 418 face the horizon, as in FIG. 4. This configuration provides radar detection in a search volume that extends below the horizon to some elevation angle, as determined by system requirements and the amount of pre-processing and post-processing that is available to telescoping radar array 100 via radar processing electronics 422.

In some other embodiments, radiating elements 418 are arranged against each support stage 204ᵢ such that they face skyward. The direction of radiation for such embodiments is depicted in FIG. 5B. This configuration provides efficient coverage of the airspace overhead with radar detection capability down toward the horizon.

Figure 12A:
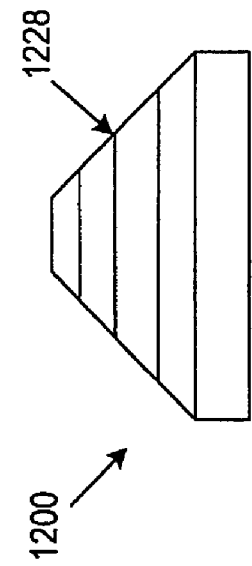

In yet some further embodiments, radiating elements 418 are mounted on a sloped face (or at an angle to a non-sloped face). This configuration provides radar detection in a search volume that extends below the horizon to some elevation angle, as determined by system requirements and the amount of pre-processing and post-processing that is available to telescoping radar array 100. Several embodiments of telescoping radar arrays in accordance with the present invention and having sloped faces are depicted in FIGS. 12A/B and 13A/B. In some embodiments, the sloped face of the support stages and, consequently, the radiating elements, are set back 22.5 degrees relative to vertical.

In view of the present disclosure, those skilled in the art will know how to arrange radiating elements 418 to cover a desired search volume as a function of post- and pre-processing capabilities, among other considerations.

Telescoping radar array 100 incorporates shielding from electromagnetic interference ("EMI"). In some embodiments, each support stage 204ᵢ comprises a non-conductive composite material that includes a conductive material (e.g., embedded mesh, etc.) suitable for providing EMI shielding. The shielding is located throughout the support stage, but is not continuous so that apertures through which each radiating element transmits and receives radiation are provided.

Radar processing electronics 422 generate considerable heat; as a consequence, cooling must be provided. In embodiments in which radar processing electronics 422 are disposed directly behind radiating elements 418, such cooling is particularly important.

Figure 6:
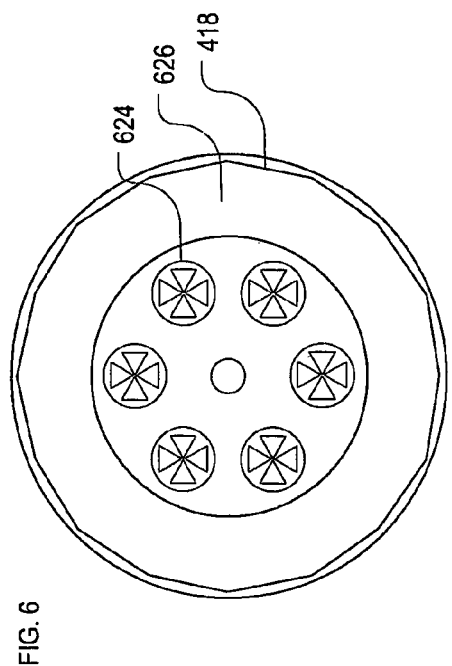
FIG. 6 depicts fans for drawing air into radar array 100, wherein the fans are disposed near the base of the radar array.

In some embodiments, especially those in which radar processing electronics 422 are disposed directly behind radiating elements 418, telescoping radar array 100 is air cooled via a forced-air cooling system. In the embodiment that is depicted in FIG. 6, the forced-air cooling system includes cooling fans 624 for drawing air into the space defined by the deployed support stages. In some embodiments, cooling fans 624 are disposed in base 626, which couples to the bottom of the radially-outermost support stage (the support stage at the bottom of deployed radar array 100).

Figure 7:
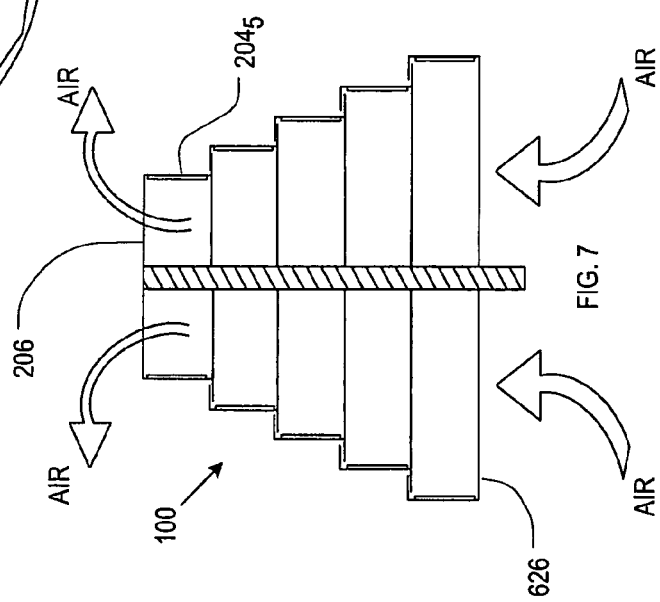
FIG. 7 depicts an embodiment of radar array 100 wherein the air that is drawn in by the fans vents from the top of the radar array.

In the embodiment that is depicted in FIG. 7, air is drawn through base 626 via fans 624 and is vented through cover 206 at the top of telescoping radar array 100. In this embodiment, cover 206 includes a louvered vent, etc., with EMI shielding and dust/sand filtration.

Figure 8:
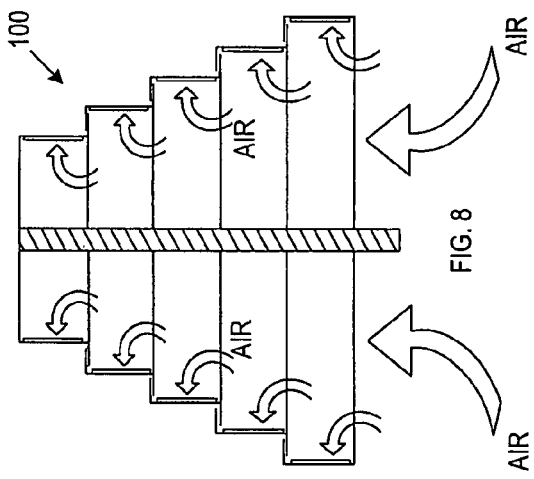
FIG. 8 depicts an embodiment of radar array 100 wherein the air that is drawn in by the fans vents through the face of each support stage.

In the embodiment that is depicted in FIG. 8, air is drawn through base 626 via fans 624 and forced past radiating elements 418 and vented through each support stage 204ᵢ. In this embodiment, each support stage has an open frame or lattice-like design wherein a "breathable" (i.e., air-permeable) material is wrapped over the frame. The material is suitably-treated for water resistance. See, U.S. patent application Ser. No. 11/427,225 entitled "Breathable Radome," incorporated by reference herein.

Figure 9A:
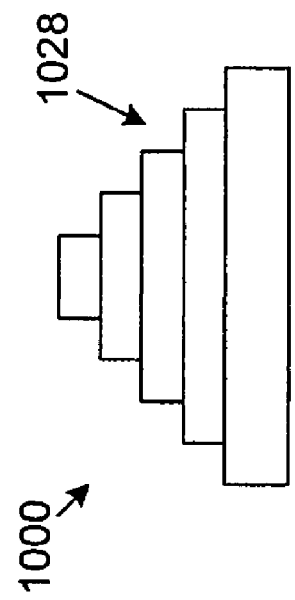

As previously noted, support stage 204ᵢ can have any one of variety of geometric configurations. FIGS. 9A/9B, 10A/10B, 11A/B, and 12A/12B depict respective top and side views of some embodiments of telescoping radar arrays in accordance with the present invention that have a different configuration than the illustrative embodiment (e.g., see FIG. 1B: radar array 100 having circular-shape support stages 204ᵢ wherein telescoped array 100 has a stepped profile).

Figure 9B:
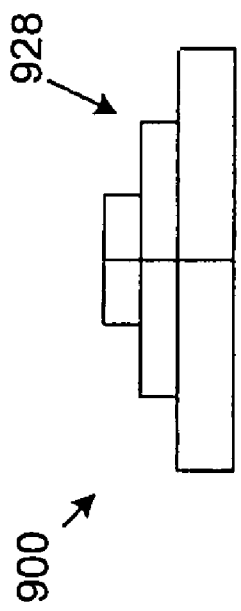
Figure 10A:
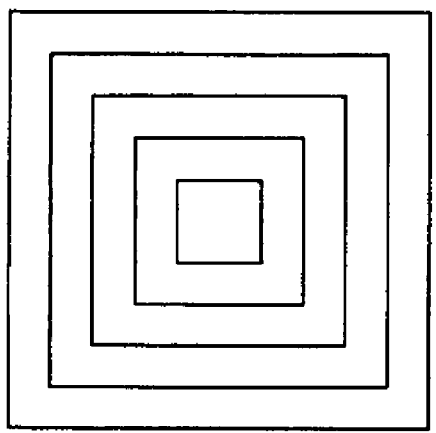
Figure 10B:
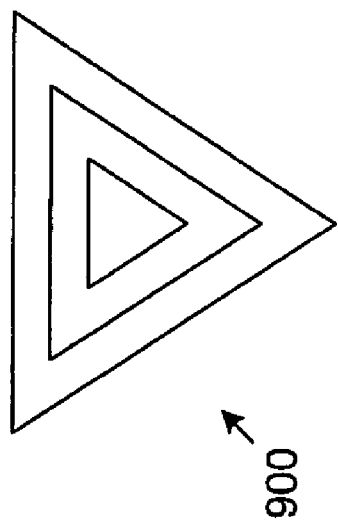

FIGS. 9A and 9B depict respective top and side views of triangular-shape support stages 204ᵢ wherein telescoped array 900 has a stepped, three-sided pyramidal profile 928. FIGS. 10A and 10B depict respective top and side views of square-shape support stages 204ᵢ wherein telescoped array 1000 has a stepped profile 1028.

Figure 12B:
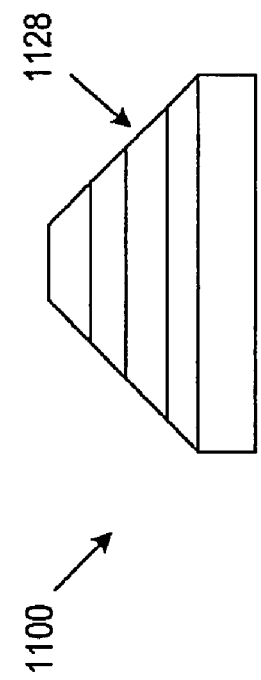
Figure 11A:
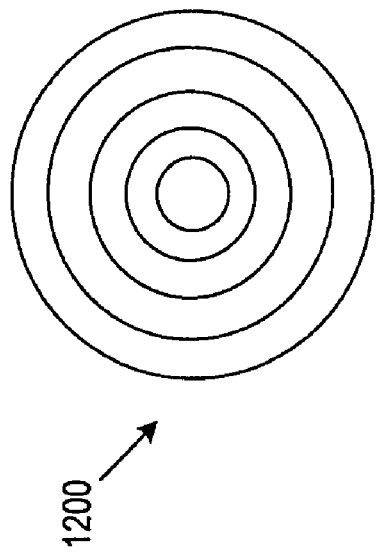
Figure 11B:
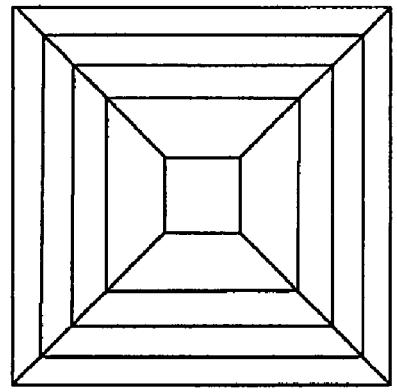

FIGS. 11A and 11B depict respective top and side views of square-shape support stages 204ᵢ wherein telescoped array 1100 has a smoothly-tapered, four-sided pyramidal profile 1128. And FIGS. 12A and 12B depict respective top and side views of circular-shape support stages 204ᵢ wherein telescoped array 1200 has a smoothly-tapered profile 1228 that results in a conical shape.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising a telescoping radar array, wherein the telescoping radar array comprises:
   a plurality of coaxial, axially-deployable, radially-spaced apart, ring-shaped support stages, wherein the support stages comprise a non-conductive composite material;
   a plurality of mechanical coupling elements, wherein the coupling elements depend from the support stages, and wherein the coupling elements that depend from radially-adjacent support stages are dimensioned and arranged with respect to one another to cause the radially-adjacent support stages to mechanically couple to one another during deployment;
   an actuator for deploying the support stages;
   a plurality of radiating elements, wherein multiple radiating elements of the plurality thereof depend from each support stage, and wherein the multiple radiating elements on each support stage are arranged to provide radar coverage over 360 degrees of azimuth; and
   radar processing electronics for data acquisition and processing, wherein the plurality of radiating elements are electrically connected to the radar processing electronics.

2. The apparatus of claim 1 wherein the actuator comprises an extendable rod that couples to the one support stage that axially-deploys the greatest distance.

3. The apparatus of claim 1 wherein the ring-shaped support stages have a circular shape.

4. The apparatus of claim 1 wherein the mechanical coupling element is a flange, wherein each support stage that deploys includes at least one flange.

5. The apparatus of claim 1 and further wherein the mechanical coupling elements of deployed, radially-adjacent support stages form a seal against precipitation.

6. The apparatus of claim 1 and further wherein the radiating elements are oriented at a set back relative to a vertical orientation.

7. The apparatus of claim 1 wherein the radar array further comprises cooling fans that draw air into the volume defined by the deployed support stages.

8. The apparatus of claim 7 wherein the air that is drawn into the volume is vented through a top of the support stage that axially-deploys the greatest distance.

9. The apparatus of claim 7 wherein each of the support stages is physically adapted to vent the air that is drawn into the volume.

10. The apparatus of claim 1 wherein the support stages include a material suitable for providing a barrier to electromagnetic interference.

11. The apparatus of claim 1 further comprising a vehicle, wherein the telescoping radar array is disposed on the vehicle.

12. The apparatus of claim 1 further comprising a pedestal, wherein at least the support stages of the telescoping radar array are disposed on the pedestal.

13. An apparatus comprising a non-rotating, telescoping radar array, wherein the telescoping radar array comprises:
    a plurality of coaxial, axially-deployable, radially-spaced apart, annular-shaped support stages;
    at least one coupling element for coupling the support stages to one another;
    an actuator for deploying the support stages in conjunction with the at least one coupling element;
    a plurality of radiating elements, wherein multiple radiating elements of the plurality thereof depend from each support stage, and wherein the multiple radiating elements on each support stage are arranged to provide radar coverage over 360 degrees of azimuth without re-positioning the support stages; and
    radar processing electronics for data acquisition and processing, wherein the plurality of radiating elements are electrically connected to the radar processing electronics.

14. The apparatus of claim 13 wherein, when deployed, the telescoping radar array defines a volume, and wherein the radiating elements are disposed within the volume abutting each support stage.

15. The apparatus of claim 14 wherein radar processing electronics is adjacent to the radiating elements.

16. The apparatus of claim 14 wherein the radar array further comprises cooling fans that draw air into the volume defined by the deployed support stages.

17. The apparatus of claim 16 wherein the air that is drawn into the volume is vented through each of the support stages.

18. The apparatus of claim 13 further comprising a vehicle, wherein the telescoping radar array is disposed on the vehicle.

19. The apparatus of claim 13 further comprising a pedestal, wherein at least the support stages of the telescoping radar array are disposed on the pedestal.

* * * * *